(12) United States Patent
Hu et al.

(10) Patent No.: US 11,377,580 B2
(45) Date of Patent: Jul. 5, 2022

(54) METHODS FOR IN SITU FORMATION OF HIGH GLASS TRANSITION TEMPERATURE POLYMERS

(71) Applicant: SCHLUMBERGER TECHNOLOGY CORPORATION, Sugar Land, TX (US)

(72) Inventors: Xiaoran Hu, Somerville, MA (US); Shitong S. Zhu, Waban, MA (US); Agathe Robisson, Cambridge, MA (US); Sepand Ossia, Arlington, MA (US); Meng Qu, Waltham, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/335,409

(22) PCT Filed: Sep. 12, 2017

(86) PCT No.: PCT/US2017/051041
§ 371 (c)(1),
(2) Date: Mar. 21, 2019

(87) PCT Pub. No.: WO2018/057332
PCT Pub. Date: Mar. 29, 2018

(65) Prior Publication Data
US 2020/0017748 A1    Jan. 16, 2020

Related U.S. Application Data

(60) Provisional application No. 62/398,610, filed on Sep. 23, 2016.

(51) Int. Cl.
*E21B 33/134*    (2006.01)
*C09K 8/44*    (2006.01)
(Continued)

(52) U.S. Cl.
CPC ............. *C09K 8/44* (2013.01); *C08F 32/08* (2013.01); *C09K 8/424* (2013.01); *C09K 8/426* (2013.01);
(Continued)

(58) Field of Classification Search
CPC ........ C09K 8/44; E21B 33/134; E21B 43/267
(Continued)

(56) References Cited

U.S. PATENT DOCUMENTS 4,049,616 A    9/1977    Scott et al.
4,380,617 A    4/1983    Minchak et al.
(Continued)

FOREIGN PATENT DOCUMENTS

WO    2012174502 A2    12/2012
WO    2016057027 A1    4/2016

OTHER PUBLICATIONS

Davidson, T. A. et al., "The polymerization of dicyclopentadiene: an investigation of mechanism", Journal of Molecular Catalysis A: Chemical, 1998, 133, pp. 67-74.
(Continued)

*Primary Examiner* — Zakiya W Bates
*Assistant Examiner* — Ashish K Varma
(74) *Attorney, Agent, or Firm* — Trevor G. Grove

(57) ABSTRACT

Methods may include introducing a polymerizable composition containing a polycyclic monomer and a catalyst into a subterranean formation; and polymerizing the polymerizable composition in the presence of the catalyst in situ to form a polymer. Methods may also include lowering a wellbore tool into the subterranean formation, wherein the tool contains a first partition containing a polymerizable composition, and a second partition containing a catalyst; releasing the polymerizable composition from the first partition; releasing the catalyst from the second partition;
(Continued)

contacting the polymerizable composition and the catalyst in a mixing region; and reacting the polymerizable composition and the catalyst in situ to form a polymer.

19 Claims, 10 Drawing Sheets

(51) Int. Cl.
  *C08F 32/08* (2006.01)
  *C09K 8/42* (2006.01)
  *C09K 8/575* (2006.01)
  *E21B 33/138* (2006.01)
  *E21B 43/267* (2006.01)

(52) U.S. Cl.
  CPC .......... *C09K 8/5756* (2013.01); *E21B 33/134* (2013.01); *E21B 33/138* (2013.01); *E21B 43/267* (2013.01)

(58) Field of Classification Search
  USPC ...................................... 166/280.2
  See application file for complete search history.

(56) References Cited

U.S. PATENT DOCUMENTS

| 10,005,947 | B2* | 6/2018 | Hurd | C09K 8/502 |
| 2007/0185343 | A1* | 8/2007 | Verpoort | C07F 15/0046 |
| | | | | 556/30 |
| 2010/0065273 | A1* | 3/2010 | Sawdon | C09K 8/24 |
| | | | | 166/293 |
| 2015/0136402 | A1* | 5/2015 | Hurd | C09K 8/502 |
| | | | | 166/305.1 |
| 2016/0257779 | A1* | 9/2016 | Cruce | C08J 5/043 |
| 2017/0081933 | A1* | 3/2017 | Nedwed | E21B 33/064 |
| 2018/0298271 | A1 | 10/2018 | Auzerais et al. | |

OTHER PUBLICATIONS

Le Gac, P. Y. et al., "Durability of polydicyclopentadiene under high temperature, high pressure and seawater (offshore oil production conditions)", Polymer Degradation and Stability, 2013, 98(3), pp. 809-817.

Grubbs, R. H.. et al., "Living Ring-Opening Olefin Metathesis Polymerization" in Polymer Science: A Comprehensive Reference, 2012, vol. 4, pp. 21-29.

Hu, Y. et al., "Water immersion aging of polydicyclopentadiene resin and glass fiber composites", Polymer Degradation and Stability, 2016, 124, pp. 35-42.

Kovacic, S. et al., "Inherently reactive polyHIPE material from dicyclopentadiene", Chemical Communications, 2010, 46, pp. 7504-7506.

Kovacic, S. et al., "Macroporous Polyolefin Membranes from Dicyclopentadiene High Internal Phase Emulsions: Preparation and Morphology Tuning", Macromol Material Engineering, 2014, 299, pp. 843-850.

Park, E-S., et al., "Ring-Opening Metathesis Polymerization of Dicyclopentadiene and Tricyclopentadiene", Macromolecular Research, 2013, 21(1), pp. 114-117.

Guidelines on qualification of materials for the suspension and abandonment of wells, Oil & Gas UK, Issue 1, Jul. 2012, ISBN: 1 903 003 85 4, 90 pages.

Search Report and Written Opinion of International Patent Application No. PCT/US2017/051041 dated Dec. 26, 2017, 17 pages.

International Preliminary Report on Patentability of International Patent Application No. PCT/US2017/051041 dated Apr. 4, 2019, 13 pages.

* cited by examiner

FIG. 1.1
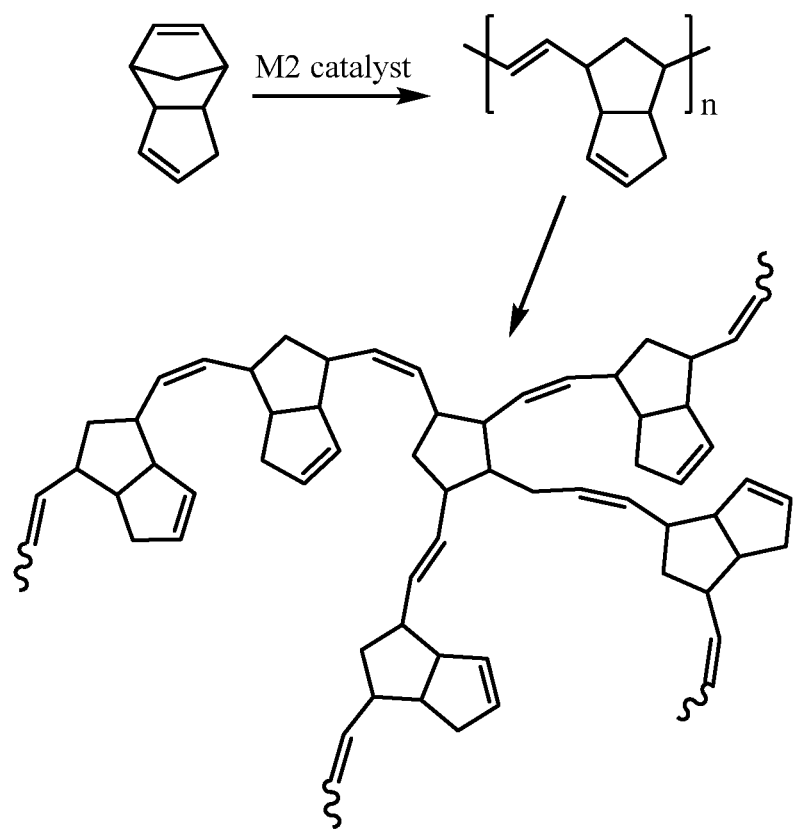
FIG. 1.2
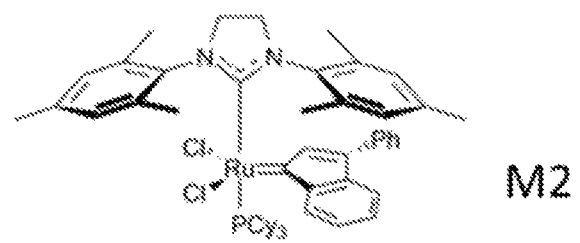

METHODS FOR IN SITU FORMATION OF HIGH GLASS TRANSITION TEMPERATURE POLYMERS

CROSS-REFERENCE TO RELATED APPLICATIONS

This disclosure claims priority from U.S. Provisional Patent Appl. No. 62/398,610, field on Sep. 23, 2016, herein incorporated by reference in its entirety.

BACKGROUND

Drilling operations typically involve mounting a drill bit on the lower end of a drill pipe or drill stem and rotating the drill bit against the bottom of the hole to penetrate the formation, creating a borehole. Wellbore fluids may be circulated down through the drill pipe, out the drill bit, and back up to the surface through the annulus between the drill pipe and the annular wall. The injection of wellbore fluids can place undesirable mechanical stress on the rock around the wellbore and may even damage the reservoir. With increasing depth a hydrostatic pressure acts outwards on the borehole, which may cause mechanical damage to the formation and reduce the ability of the well to produce oil or gas.

Formation damage and fractures that occur during drilling may require shutdown of operations, removal of the drill-string from the wellbore, and repair to seal the fractures before drilling can continue. Depending on the particular operation, various treatment fluids may be emplaced downhole to remediate formation damage, including physical treatments that contain viscosifying agents or particulate solids that reduce the mobility of fluids into formation defects or form aggregates that obstruct fractures or pores downhole. Other repair methods may include use of chemical treatments that include polymer- or gel-forming components and cements that harden or set up to produce seals downhole.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, methods in accordance with the present disclosure may include introducing a polymerizable composition containing a polycyclic monomer and a catalyst into a subterranean formation; and polymerizing the polymerizable composition in the presence of the catalyst in situ to form a polymer.

In another aspect, methods in accordance with the present disclosure may include lowering a wellbore tool into the subterranean formation, wherein the tool contains a first partition containing a polymerizable composition, and a second partition containing a catalyst; releasing the polymerizable composition from the first partition; releasing the catalyst from the second partition; contacting the polymerizable composition and the catalyst in a mixing region; and reacting the polymerizable composition and the catalyst in situ to form a polymer.

Other aspects and advantages of the invention will be apparent from the following description and the appended claims.

BRIEF DESCRIPTION OF FIGURES

FIG. 1.1 depicts ROMP of DCPD with a catalyst in accordance with embodiments of the present disclosure;

FIG. 1.2 depicts a catalyst in accordance with embodiments of the present disclosure;

DETAILED DESCRIPTION

Figure 2:
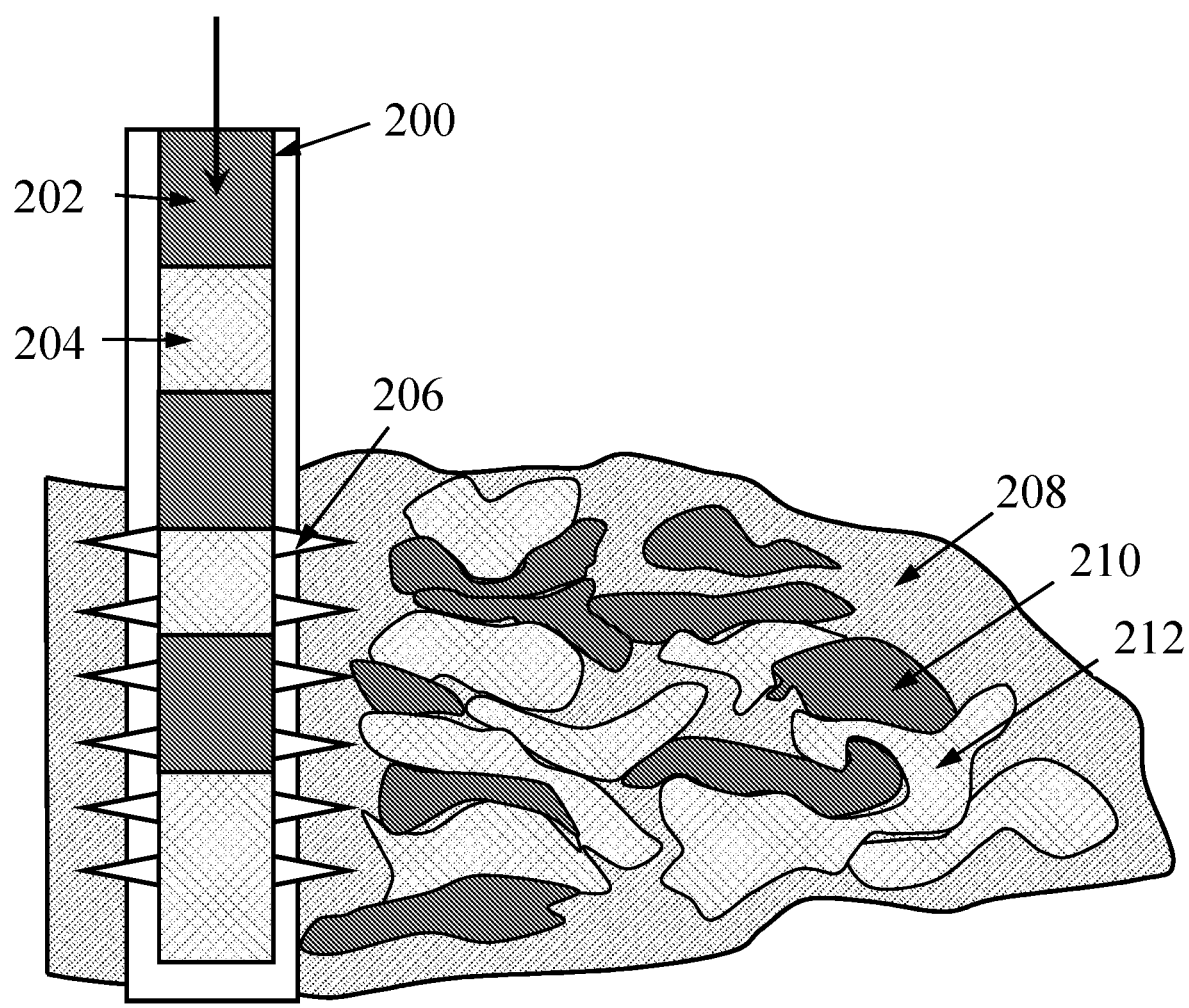
FIG. 2 is an illustration of a treatment fluid being injected into a wellbore interval in accordance with embodiments of the present disclosure.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

In one aspect, embodiments of the present disclosure are directed to polymerizable compositions that remain liquid until combined with a suitable catalyst to form a polymer in situ downhole. In one or more embodiments, polymerizable compositions may incorporate polycyclic olefins such as polydicyclopentadiene (pDCPD) to generate high glass transition temperature (Tg) thermosets having extensive cross-linked networks. High Tg polymers in accordance with the present disclosure may exhibit long term stability in downhole high pressure, high temperature (HPHT) conditions over other polymer systems such as epoxy, and may be used to replace or augment existing polymerizable compositions in and outside of the oil and gas industry.

In another aspect, methods of the present disclosure are directed to polymerizable compositions that are capable of controlled polymerization initiation and polymerization rate. Polymerizable compositions in accordance with the present disclosure may remain stable during transport to a treatment site, and then combined with a catalyst to initiate polymer formation at a targeted interval in situ. Combination of the catalyst and the polymerizable composition may be done by simultaneous injection through mixer in some embodiments, or may be done through sequential injection or overflushing of one of the components in other embodiments.

In some embodiments, polymerizable compositions may be formulated with a solvent such as a benzoate ester to control melting point and/or viscosity of the polymerizable composition. Controllable polymerization enables the use of polymer systems in a number of practical uses including lost circulation mitigation, cement replacement/remediation and zonal isolation, sand control, water control, plugging and abandonment, the generation of propping structures during frac operations, and the like.

In one or more embodiments, polymerizable compositions in accordance with the present disclosure may polymerize by ring opening metathesis polymerization (ROMP). With particular respect to FIG. 1.1, an example of ROMP polymerization and crosslinking is shown. In a first reaction, dicyclopentadiene (DCPD) polymerizes in the presence of a catalyst to form pDCPD. In a second reaction, the unsaturated dicyclopentene backbone of pDCPD may further react with DCPD or pDCPD oligomers and polymers to generate crosslinked pDCPD. Polymerization of DCPD may be mediated by a number of catalysts including ruthenium and molybdenum based metathesis catalysts. In some embodiments, polymerizable compositions may include one or more Ru-based catalysts such as that shown in FIG. 1.2 that initiate polymerization of polycyclic olefins even in the presence of moisture and trace oxygen.

In one or more embodiments, polymerizable compositions in accordance with the present disclosure may be capable of producing polymers having controlled mechanical properties and densities. Polymerizable compositions may be incorporated into wellbore treatments and fracturing operations as additives that solidify in situ to prop open natural and existing fractures and/or function as fluid loss control or remediation materials. Polymerizable compositions in accordance with the present disclosure may be emplaced within a formation as a component of a multistage fracturing fluid that generates polymer clusters or "pillars"—load-bearing support structures—that stabilize fractures within a given formation. Methods in accordance with the present disclosure may include creating and improving fracture conductivity using polymerizable compositions that cure in situ during fracturing operations. Polymerizable compositions may be formulated as a fluid, emulsion, foam, or slurry in some embodiments, and may be used in conjunction with a number of additives. For example, polymerizable compositions may include additives to reinforce the final pillars and/or inhibit settling of the polymerizable composition during emplacement in a fracture.

Polymerizable compositions in accordance with the present disclosure may be prepared in a variety of formulations and reacted using different chemical routes to create the pillars in situ under downhole conditions. In some embodiments, variables such as injection time and pumping speed may be used to tune the size of the pillars generated within formation fractures and, in turn, the fluid conductivity of a fracture network. Polymerizable compositions in accordance with the present disclosure may be emplaced within one or more regions of a wellbore, such as during sequential fracturing operations within different intervals of the wellbore including operations within deviated and horizontal wells.

Methods in accordance with the present disclosure may be used in the creation of staged fractures along a wellbore. In one or more embodiments, fracturing methods may include initiating formation fracturing by injecting a fluid into the wellbore at a pressure equal to or greater than the fracture initiation pressure of the formation, followed by the injection of a multistage treatment that may include one or more stages of a polymerizable composition and one or more stages of a spacer fluid. Injection of the stages of the multistage treatment fluid may be performed separately and/or simultaneously. In some embodiments, the spacer fluid may contain a filler material that is removed to form open channels around pillars of cured polymer that permit fluids to flow through the fracture and toward the wellbore.

Figure 3:
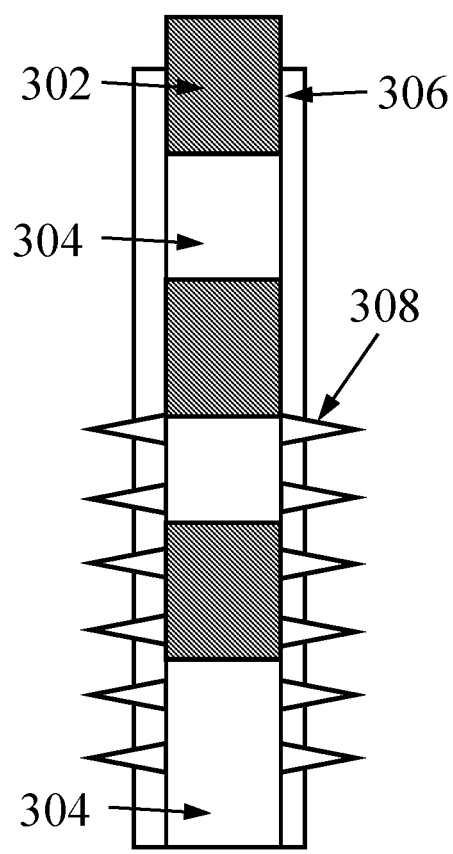
FIG. 3 is an illustration of the delivery of a treatment fluid pumping sequence into a fractured wellbore interval in accordance with embodiments of the present disclosure.

FIGS. 2 and 3 depict embodiments of placement methods for treatment fluids in accordance with the present disclosure into a formation. In some embodiments, treatment fluids may be administered by alternating the injection of fracturing fluids containing polymerizable compositions and spacer fluids to create support pillars within wellbore and formation fractures that increase permeability of the fractures to connate fluids following fracturing operations.

With particular respect to FIG. 2, a method of placement of the injection fluid is depicted in which a well treatment fluid is injected in stages that alternate between polymerizable compositions 202 and a spacer fluid 204 through a wellbore 200 through fractures 206 and into the formation 208. Following emplacement, the polymerizable composition 202 of the treatment fluid may form pillars 210 in formation fractures 208 with interspersed channels that increase the permeability of the formation to fluid flow.

Spacer fluids 204 in accordance with the present disclosure may include a number of additives, such as filler materials, that maintain separation between the polymerizable composition stages during emplacement, and later dislodge, dissolve, or otherwise are removed to generate flow channels between pillars produced by the cured polymerizable composition. During emplacement into the formation, polymerizable compositions 202 and spacer fluid 204 containing a filler material are introduced within a fracture in such a way that the spacer fluid is segregated from the polymerizables, creating clusters or islands of polymerizable composition that cure to form solid pillars to hold open the fracture. Following the cure of the polymer pillars, the remaining filler material may be removed to form open channels around the polymer pillars for unimpeded fluid flow through the formation. Removal of filler material may be influenced by such factors as invasion of formation fluids, hydrolysis, downhole temperatures, incipient or delayed degradation agents in the filler material, introduction of an activating fluid that degrades the filler material, and the like, or any combination thereof.

In one or more embodiments, the spacer fluids 204 may be formulated to exhibit density and viscosity similar to that of the polymerizable composition 202, such that the multistage fluid may be transported into the wellbore with limited dispersion, fingering, or interface instability between stages. In some embodiments, the variation in density and viscosity may also be accounted for by combining one or both stages with filler materials such as solids and/or surfactants that modify the rheology of the treated stage. For example, a polymeric or viscoelastic rheology modifier may be added to the spacer fluid and/or the polymerizable composition to control fluid loss and leak off of fluid treatments into the formation, which may be formulated for a given formation by considering fracture network geometry such as width, height, length, and branchedness, to remedy fluid loss. In another example, the spacer stage of a multistage treatment may be modified to include a degradable fiber to enhance transport properties of the treatment fluid and to provide resistance to mixing at the interface between the spacer stages and the stages containing polymerizable composition.

In one or more embodiments, there may be no fluid interface stability issues during pumping, and the spacer fluid 204 may be a standard fracturing fluid. With particular respect to FIG. 3, the polymerizable composition 302 and spacer fluid 304 may have compatible density and viscosity profiles, and the spacer fluid may be introduced into formation 306 through one or more fractures 308 with or without filler materials. The fracturing fluid 304 and polymerizable compositions 302 may then be introduced into the formation sequentially as part of a multistage wellbore treatment.

In one or more embodiments, the spacer fluid (204, 304) and/or the base fluid of the polymerizable composition (202, 302) may be aqueous, oleaginous, an invert or direct emulsion, or a foam having a gaseous internal phase such as nitrogen, carbon dioxide, or natural gas. Foamed treatments may possess high viscosity compared to the base liquid, fluid loss comparable to that of crosslinked fluids in low matrix permeability, and excellent solid transport capability. Polymerizable compositions formulated as foams remain compatible with the cluster chemistry responsible for the creation of solid pillars, and may enable a more rapid and more complete return of the treating fluid. Foam treatments may also be useful in low pressure reservoirs and in depleted zones. Foam formulations of polymerizable compositions may also minimize the dilution of activators with connate and added aqueous fluids, may enhance production, and may reduce operational water consumption. In some embodiments, polymerizable compositions may be combined with the conventional crosslinked fluids or used in conjunction with slickwater approaches.

In one or more embodiments, treatment fluid stages may vary in volume from one operation to another. For example, the size of the proppant pillars and the spacing between may be tunable by changing the pumping schedule of the pulse pumping strategy, including changing the volume of injected fluid for each of the stages in the multistage treatment. For example, with a shorter polymerizable composition pumping interval smaller pillars are obtained. The spacing between pillars can also be controlled by the pumping strategy. In addition, the formation and the strength of the solid pillars can be tuned by tuning the chemical composition of the polymerizable composition, the liquid-solid ratio, the curing conditions such as curing temperature and time, the particle size distribution of the polymerizable material, and the like. In one or more embodiments, the compressive yield strength of polymer solid may range from 1 MPa to 90 MPa at room temperature.

Figure 4:
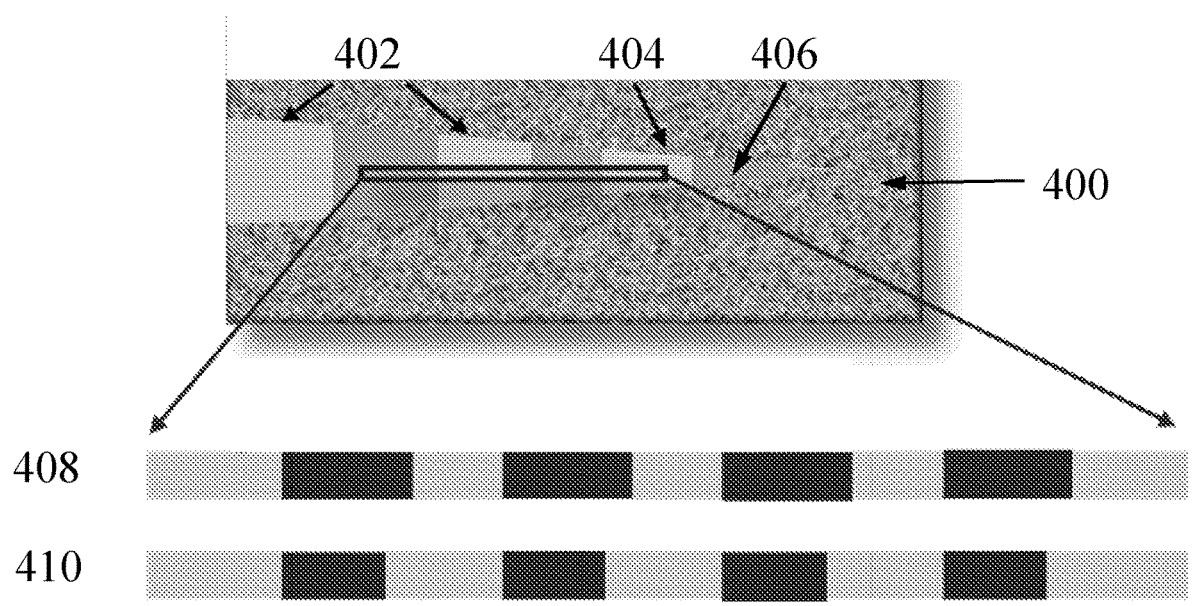
FIG. 4 is an illustration showing the formation of polymeric pillars for various pumping regimes in accordance with embodiments of the present disclosure.

With particular respect to FIG. 4, an example of a pulse pumped fluid treatment in accordance with the present disclosure is shown. A fracture 404 in a formation 400 contains an injected treatment fluid having alternating stages of polymerizable composition 406 and spacer fluid 402. In some embodiments, control over the size of the polymer pillars may involve increasing the ratio of the polymerizable composition fluid component with respect to the spacer fluid interval as shown in pumping schedule 408. Conversely, with a shorter pumping interval for the polymerizable composition component, smaller pillars may be obtained. The spacing between pillars may also be controlled by adjusting the spacer fluid stages between the polymerizable composition component stages in the pumping schedule as shown in 410. The volume of the polymerizable composition stages may be adjusted with respect to the spacer fluid stages in some embodiments to suit various formation parameters such as porosity, elastic modulus, and the like. In some embodiments, the polymerizable composition may be administered in a gated fashion, or switched on an off while the aqueous phase is continuously pumped.

The volume of the spacer fluid 402 and polymer-containing component 406 may vary with respect to each other and may change during the duration of the job. In one or more embodiments, the ratio of the volume of the polymer-containing component to spacer fluid may range from 1:0.1 to 0.1:1. In some embodiments, the ratio of the polymer-containing component to spacer may range from 1:0.5 to 0.5:1.

In some embodiments, one or more stages of polymerizable composition and one or more stages of spacer fluid may be injected in volumes that range from 2 to 10 oilfield barrels (bbl). Treatment fluid stages may be injected in alternating fashion in sequence in which each stage is pumped for a duration that may range from 5 to 20 seconds, or from 10 to 15 seconds in some embodiments. Methods in accordance with the present disclosure may utilize injection rates that may range from 5 to 60 bbl/min in some embodiments, and from 10 to 50 bbl/min in some embodiments. The relative volume of the injected stages of polymerizable composition and spacer fluid and the pulse pumping time in the pumping schedule may vary with respect to each other in some embodiments, and may change during the execution of a given operation.

Polycyclic Olefins

Polymerizable compositions in accordance with the present disclosure may contain one or more polycyclic olefins that may include bicyclic and polycyclic olefin monomers, which may include one or more of dicyclopentadiene, tricyclopentadiene, dicyclohexadiene, norbornene, 5-methyl-2-norbornene, 5-ethyl-2-norbornene, 5-isobutyl-2-norbornene, 5,6-dimethyl-2-norbornene, 5-phenylnorbornene, 5-benzylnorbornene, 5-acetylnorbornene, 5-methoxycarbonylnorbornene, 5-ethoxycarbony-1-norbornene, 5-methyl-5-methoxy-carbonylnorbornene, 5-cyanonorbornene, 5,5,6-trimethyl-2-norbornene, cyclo-hexenylnorbornene, endo, exo-5,6-dimethoxynorbornene, endo, endo-5,6-dimethoxynorbornene, endo, exo-5,6-dimethoxycarbonylnorbornene, endo, endo-5,6-dimethoxycarbonylnorbornene, 2,3-dimethoxynorbornene, norbornadiene, tricycloundecene, tetracyclododecene, 8-methyltetracyclododecene, 8-ethyl-tetracyclododecene, 8-methoxycarbonyltetracyclododecene, 8-methyl-8-tetracyclo-dodecene, 8-cyanotetracyclododecene, pentacyclopentadecene, pentacyclohexadecene, and the like.

Additional examples of bicyclic and polycyclic olefins include, without limitation, higher order oligomers of cyclopentadiene such as cyclopentadiene tetramer, cyclopentadiene pentamer, and the like; and C2-C12 hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like. In some embodiments, polymerizable compositions may include a mixture of two or more olefins, including any of those described above.

In one or more embodiments, polymerizable compositions in accordance with the present disclosure may include mixtures of DCPD and TriCPD, which may increase the strength of the final pDCPD over DCPD monomer alone.

The ratio of DCPD:TriCPD may range from 0.5:1 to 1:0.1 in some embodiments, and from 0.20:1 to 1:0.20 in other embodiments.

Polymerizable compositions in accordance with the present disclosure may produce polymers having a glass transition temperature, Tg, in the range of at least 200° F. in some embodiments, and above 300° F. in some embodiments.

Emulsions and Surfactants

Polymerizable compositions in accordance with the present disclosure may be formulated as an emulsion in which a catalyst is solubilized within an internal phase of an emulsion. Emulsified polymerizable compositions may be mixed on site and injected into a vertical or horizontal wellbore, where downhole temperatures or pH changes may or may not disrupt the emulsion and initiate the reaction of the polycyclic olefin and the catalyst. Emulsified compositions may be used in vertical and horizontal wells, where the emulsion stabilizes the polymer-forming reactants and allows greater travel of the composition prior to formation of the polymer. For example, an emulsified polymerizable composition may increase the effective treatment radius beyond 15 ft in some embodiments.

In one or more embodiments, a catalyst may be loaded within an internal phase of a polymerizable composition at a concentration ranging from 14-500 ppm of the polymerizable composition.

Surfactants that may be used to generate emulsions in accordance with the present disclosure include the poloxamer family of non-ionic triblock copolymers such as SYNPERONICS™, PLURONICS™, and KOLLIPHOR™ from BASF. The amounts of both resin and catalyst are carefully chosen and controlled for the specific well conditions to avoid premature hardening.

Benzoate Esters

Polycyclic olefins such as DCPC are often waxy solids at temperatures below their melting point (34-35° C. for DCPD). In order to decrease the melting point of the monomer components of the polymerizable composition, a solvent may be used to decrease the melting point and generate a low viscosity fluid at ambient temperature. The solvent may be non-flammable, non-toxic, and low viscosity in some embodiments.

In one or more embodiments, solvents in accordance with the present disclosure may include benzoate esters having high boiling and flash point that can be hydrolyzed downhole in an aqueous environment to form hydrophilic small molecules (degradable) that eventually diffuse into water to minimize the adverse impact of non-reactive residual solvents on the properties of the polymers. In a particular embodiment, ethyl benzoate (EB) with a boiling point of 222° C. and a flash point at 93° C., may be used as a solvent for polymerizable compositions in accordance with the present disclosure.

Benzoate esters in accordance with the present disclosure include alkyl benzoates such as ethyl benzoate, propyl benzoate, and the like. Benzoate solvents may include branched and straight chain alkyl esters of benzoic acid such as methyl benzoate, ethylbenzoate, n-propyl benzoate, n- and iso-butyl benzoates, n- and iso-amyl benzoates, n-hexyl benzoate, n-octyl benzoateand 2-ethylhexyl benzoate; primary alkyl esters of toluic acid such as methyl toluate, ethyl toluate, n-propyl toluate, n- and iso-butyl toluates, or 2-ethylhexyl toluate; primary alkyl esters of ethylbenzoic acid such as methyl ethylbenzoate, ethyl ethylbenzoate, n-propyl ethylbenzoate, and n- and iso-butyl ethylbenzoates; primary alkyl esters of xylenecarboxylates such as methyl 3,4-xylene-1-carboxylate, ethyl 3,5-xylene-1-carboxylate, and n-propyl 2,4-xylene-1-carboxylate; primary alkyl esters of anisic such as methyl anisate, ethyl anisate, n-propyl anisate, n-butyl anisate and iso-butyl anisate; and primary alkyl esters of naphthoic acid such as methyl naphthoate, ethyl naphthoate, n-propylnaphthoate, n-butyl naphthoate, and iso-butyl naphthoate.

Benzoate esters in accordance with the present disclosure may be used in trace amounts up to 50 percent by volume (vol %) of the polymerizable composition in some embodiments. Benzoate esters may be used at a vol % of the polymerizable composition within the range of 0.25 vol % to 50 vol % in some embodiments, and within the range of 0.5 vol % to 20 vol % in some embodiments. While the concentration of benzoate solvent may be more or less, the volume of solvent may be modified until the melting point of the polycyclic olefin is below ambient room temperature.

Catalysts

In one or more embodiments, polymerizable compositions in accordance with the present disclosure may include metathesis catalysts such as dichloro[1,3-bis(2,4,6-trimethylphenyl)-2-imidazolidinylidene](3-phenyl-1H-inden-1-ylidene)(triphenylphosphine)ruthenium(II) catalyst. In some embodiments, catalysts in accordance with the present disclosure may include one or more of tricyclohexylphosphine[1,3-bis(2,4,6-trimethylphenyl)imidazol-2-ylidene][3-phenyl-1H-inden-lylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene] ruthenium(II) dichloride, tricyclohexylphosphine[1,3-bis(2,4,6-trimethylphenyl)-4,5-dihydroimidazol-2-ylidene] [(phenylthio)methylene]ruthenium(II) dichloride, (tricyclohexylphosphine)-3-phenyl-1H-inden-lylideneruthenium(II) dichloride, 1,3-Bis(2,4,6-trimethylphenyl)-4,5-dihydroimidazol-2-ylidene[2-(ipropoxy)-5-(N,N-imethylaminosulfonyl)phenyl] methyleneruthenitun(II) dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenitm1(II) chloride. In some embodiments, the catalyst may be 1,3-Bis(2,4,6-trimethylphenyl)-4,5-dihydroimidazol-2-ylidene[2-(i-propoxy)-5-(N,N-dimethylaminosulfonyl)phenyl]methyl eneruthenium(II) dichloride and/or Tricyclohexylphosphine[3-phenyl-1H-inden-lylidene][1,3-bis(2,4,6-trimethylphenyl)-4,5-dihydroimidazol-2-ylidene]ruthenium(II) dichloride.

Catalysts in accordance with the present disclosure may be added to a polymerizable system at a concentration that ranges from 10 to 100 ppm in mole in some embodiments, and from about 20 to 30 ppm in mole in other embodiments.

Electron Donating Groups

Catalysts in accordance with the present disclosure may be modified with one or more electron donating groups that modify the reaction rate of the polymerization reaction for the respective polycyclic olefin (or olefin mixture). In one or more embodiments, electron donating groups that may be used to modify catalysts in accordance with the present disclosure include groups such as tri-isopropyl phosphate (i-PrO)3P, tri-n-butylphosphine, and triphenyl phosphine.

Hydroperoxide Agents

In one or more embodiments, hydroperoxide agents in accordance with the present disclosure may be added to delay ROMP reactions. Hydroperoxide agents are known as acting as activators in some systems (e.g., U.S. Pat. Nos. 4,380,617 and 4,049,616), but in polymerizable compositions in accordance with the present disclosure may decrease the rate of polymerization in ROMP. In some embodiments, hydroperoxide agents may be added to polymerizable compositions in accordance with the present disclosure to modify the rate of polymerization of olefins such as DCPD.

Hydroperoxide agents in accordance with the present disclosure may include any organic hydroperoxide that is effective to delay the onset of the gel state, such as C2-C24 alkyl hydroperoxides, C5-C24 aryl hydroperoxides, C6-C24 alkaryl hydroperoxides, including secondary or tertiary aliphatic or aromatic hydroperoxides. In some embodiments, hydroperoxide agents may include tert-butyl hydroperoxide, tert-amyl hydroperoxide, cumene hydroperoxide, 1,1,3,3-Tetramethylbutyl hydoperoxide, and Isopropylcumyl hydroperoxide. Hydroperoxide agents may be added to the reaction mixture in the absence of solvent, or as organic or aqueous solutions. A single hydroperoxide agent may be used in polymerizable systems in accordance with the present disclosure, or a combination of two or more different hydroperoxide agents may be used.

Hydroperoxide agents in accordance with the present disclosure may be added to a polymerizable system at a concentration that ranges from 0.01% to 0.5% weight percentage (or 1 to 3500 mole ppm) of monomers in some embodiments, and from about 0.01% to 0.05% (or 1 to 350 mole ppm) of monomers in other embodiments.

In one or more embodiments, the hydroperoxide agent may be added with respect to the catalyst in the polymerizable system. The hydroperoxide agent concentration may be between 0.03 and 125 equivalents mole with respect to catalyst in some embodiments, and from 1 and 13 equivalents mole with respect to catalyst in other embodiments.

Base Fluid

Polymerizable compositions in accordance with the present disclosure may be aqueous, oleaginous, and oil-in-water or water-in-oil emulsions. In one or more embodiments, base fluids used to prepare polymerizable compositions in accordance with the present disclosure may also include foams and other activated fluids. Base fluids useful for preparing fluid formulations in accordance with the present disclosure may include at least one of fresh water, sea water, brine, mixtures of water and water-soluble organic compounds, and mixtures thereof. In various embodiments, the aqueous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts.

Additionally, brines that may be used in the wellbore fluids disclosed herein may be natural or synthetic, with synthetic brines tending to be much simpler in constitution. In one embodiment, the density of the wellbore fluid may be controlled by increasing the salt concentration in the brine (up to saturation, for example). In a particular embodiment, a brine may include halide or carboxylate salts of mono- or divalent cations of metals, such as cesium, potassium, calcium, zinc, and/or sodium.

Other suitable base fluids useful in methods described herein may be oil-in-water emulsions or water-in-oil emulsions in one or more embodiments. Suitable oil-based or oleaginous fluids that may be used to formulate emulsions may include a natural or synthetic oil and in some embodiments, the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Additives

Although the chemistry described above are for ROMP of polycyclic olefins, common fillers such as fibers, sand, ceramic particles, carbon black, barium sulfate, other polymer particles, metal powders, minerals, and others that do not interfere with ROMP may be combined with polymerizable compositions in accordance with the present disclosure.

Spacer fluids used in multistage treatments in accordance with the present disclosure may include a number of additives, such as filler materials, that maintain separation between the polymerizable composition stages during emplacement, and later dislodge, dissolve, or otherwise are removed to generate flow channels between pillars produced by the cured polymerizable composition. Filler materials in accordance with the present disclosure may include degradable fibers such as polylactic acid, polyglycolic acid, nylon, starch fibers; or non-degradable fillers such as silica flour and nano-cellulose.

In one or more embodiments, thermoplastic or thermoset monomers, oligomers or pre-polymers in liquid form may be mixed with the polymerizable composition to tune the mechanical properties of the pillars. For example, the addition of a thermoplastic or thermoset may help confine polymer fines under compressive stress and decrease brittleness. Polymerizable additives in accordance with the present disclosure may include monomer, oligomer, or pre-polymer solutions of thermoplastics that form solids under downhole condition (with or without the presence of an initiator).

Thermoplastics in accordance with the present disclosure include polyolefins such as polyethylene and polypropylene, polystyrene, polystyrene copolymers, acrylic polymers, polyvinyl chloride, polyvinyl acetate, polycarbonate, and the like. Thermosets may be any thermoset pre-polymers in liquid form, which react to form polymers under downhole condition. Thermosets in accordance with the present disclosure include crosslinked acrylic, crosslinked polyesters such as unsaturated polyester resins, epoxy, vinyl esters, and phenolic resin. Thermoplastics and thermosets in accordance with the present disclosure also include copolymers of any of the above types of polymers.

In one or more embodiments, the mechanical properties of polymer pillars generated from polymerizable compositions in accordance with the present disclosure may be tuned by incorporating additives such as nanoparticles, microparticles, conventional proppants such as sand and ceramic particles, and fibers. Non-limiting examples of the reinforcing nanoparticles or fillers include but are not limited to carbon black, clay nanoparticles, silica, and barium sulfate. Non-limiting examples of the reinforcing fiber fillers include but is not limited to carbon fiber, glass fibers, polyether-ether-ketone fibers, polymethyl methacrylate fibers, cellulosic fibers, and carbon nanotubes such as single wall carbon nanotube and multiwall nanotubes either with or without functionality.

Anti-settling agents, such as clays, modified clays, fumed silica etc. may be included in the polymerizable compositions containing high density fillers.

In one or more embodiments, polymerizable compositions and multistage treatment fluids may include a variety of functional additives to improve fluid properties and to mitigate formation damage. In some embodiments, functional additives may include scale inhibitors, demulsifiers, wettability modifiers, formation stabilizers, paraffin inhibitors, asphaltene inhibitors, and the like. Other functional additives may include oxidizing breakers, corrosion inhibitors, compressed gases, foaming agents, and similar chemicals that improve the performance of the fracturing fluid.

Applications

The ability to form high Tg polymers in a wellbore setting using polymerizable compositions in accordance with the present disclosure may find utility in a number of diverse applications. While some applications are highlighted below, it is envisioned that polymerizable compositions in accordance with the present disclosure may be used in conjunction with, or as a replacement for, other standard treatment packages used to address fluid loss, divert wellbore fluids, remediate or replace cements, and strengthen unconsolidated or weakened formations.

Pillar Formation

In one or more embodiments, polymerizable compositions in accordance with the present disclosure may be formulated as multistage treatment fluids that contain a predetermined sequence of stages of fluid volumes, including one or more stages of a polymerizable composition that create a series of pillars that function to prop open natural and induced fractures and provide regions of increased permeability through fractured networks. When employed during fracturing operations, a polymerizable composition may be emplaced within an interval of a wellbore during fracture initiation, enter into the fractures, and aggregate to generate support structures that prop open the fractures without damaging the overall fracture network.

In some embodiments, polymerizable compositions may be selected such that the formation of the polymer occurs before the fracture closure stress seals opened fractures. Polymer pillars may then hold existing and newly formed fractures open, while eliminating or minimizing uncontrolled propagation of fractures from the wellbore. Moreover, during production, Polymer pillars generated may hold fractures open at discrete locations while reservoir fluids are transported through open channels and voids between the pillars.

Lost Circulation Mitigation

Polymerizable compositions in accordance with the present disclosure may be used as a fluid loss treatment that forms a very strong and stable thermoset, that may be used as a permanent remedy to minimize lost circulation in some embodiments.

In some embodiments, polymerizable compositions formulated with solvents such as benzoate esters may exhibit low viscosity compared to epoxy or phenolic resins, and can penetrate deep into permeable formations and narrow channels to seal-off undesired fluid flow after the loss of oil-based drilling mud to the formation. In a particular embodiment, a polymerizable composition containing a DCPD resin mixed with a ROMP catalyst could be pumped down inside the drill string, into the annulus (or directly into the annulus), and allowed to cure in narrow channels.

Sand Consolidation

Polymerizable compositions in accordance with the present disclosure may be used to minimize the undesirable production of sand from weak sandstone formations. Polymerized DCPD may bind grains of sand to form a consolidated mass at their contact points while maintaining sufficient permeability to achieve viable production rates. Polymerizable compositions in accordance with the present disclosure may have low viscosity and toxicity profiles.

Polymerizable compositions in accordance with the present disclosure may be used in sand consolidation applications where a generated polymer exhibits a high Tg thermoset that withstands deformation and displacement. Comparative resin formulations containing epoxy, furan and, phenol have a relatively high viscosity and toxicity, which may cause the placement to be uneven when injected downhole. For example, high viscosity formulations may work better in interval lengths of 10 to 15 ft, and may not be suitable for formations with permeability less than about 50 md. Furthermore, at a temperature greater than 255° F., comparative polymers may not provide sufficient strength due to their low Tg.

Well Plug and Abandonment

Oil and gas wells, after their useful production life, are plugged using mechanical plugs, cement plugs, drilling mud, etc. in the wellbore at specific intervals, to prevent the reservoir fluids from migrating uphole over time and possibly causing contamination. The plugging process usually takes capital and time to complete with otherwise no return on investment for oil companies. Therefore, low operational cost and reliable well plugging and abandonment are always desirable. The low viscosity of DCPD monomer and good high temperature and long term stability of pDCPD make it a good candidate to be used with cement plugs. The DCPD monomer can penetrate into, polymerize and seal the cracks, fractures in cement plugs, and the interphase between cement and formation. Thus, the rate of permeation of downhole fluids may be reduced when pDCPD is used to seal the cement, and the total length of the cement plugs and cost may be reduced.

PDCPD alone and its filled/reinforced composites can be used as a barrier material for plugging and abandonment. When compared to other polymers such as epoxy, polyester, vinylesters, PE, PP, PEEK, PPS, etc. pDCPD has a good balance of lower viscosity to accommodate for larger filler/reinforcement loading, high Tg for high temperature wells, better long term stability, better mechanical properties, easier processing, and a lower cost.

Cement Replacement and Remediation

The ability to control the reaction of this resin, its low cost, its rheology, its long term stability, and its good mechanical properties after setting makes it a good candidate for cement replacement and cement squeeze during repair. The resilience of the set resin makes it a good candidate for horizontal wellbore cementing particularly when fracturing applications may induce cement cracks and hydraulic conductivity.

Enhanced Recovery

Fracturing operations in accordance with the present disclosure may be used in combination with enhanced recovery techniques that improve fracture initiation such as acid spearheading and high viscosity pill injection, or such techniques may be modified to contain treatment fluid materials. In some embodiments, a spearheading treatment may be injected to remove formation damage or increase permeability prior to injection of treatment fluids in accordance with the present disclosure. Methods may also include pumping a tail-in fluid following treatment fluids in accordance with the present disclosure that may be designed to improve the near wellbore connectivity to one or more hydraulic fractures and prevent unintentional fracture pinchout at the wellbore. In some embodiments, tail-in fluids may include proppant and additional proppant flowback control additives such as resin coated proppant, geometrically diverse proppants such as rods or ellipsoids, particulates, fibers, and other solids.

Figure 5:
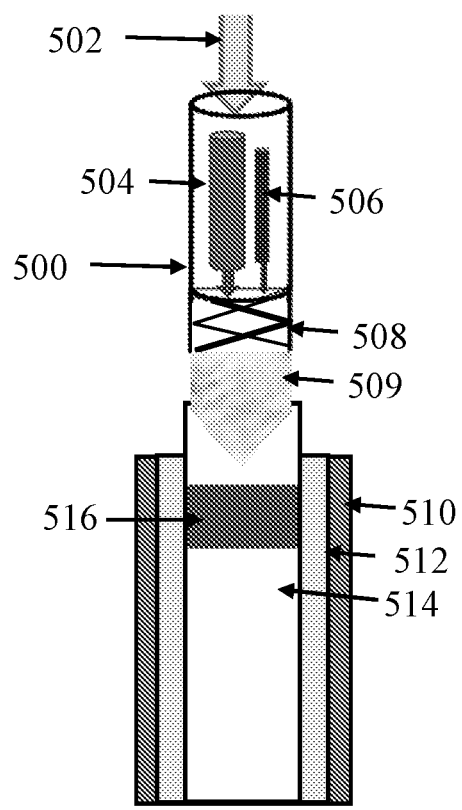
FIG. 5 is an illustration of a wellbore tool used to deliver polymerizable compositions in accordance with embodiments of the present disclosure.

Other potential applications in accordance with the present disclosure may include the use of diversion pills, such as commercially available BROADBAND™ sequence pills, to improve the wellbore coverage of treatment fluids in accordance with the present disclosure. In embodiments incorporating diversion pills, a diversion pill may be pumped after a treatment fluid containing a sequence of alternating pulses of treatment and spacer fluid to inhibit fracture growth in a selected location. For example, a diversion treatment may be applied to one particular perforation cluster to limit growth, while diverting subsequent treatments to other intervals and enabling fractures to initiate at new perforation clusters previously surrounding by more permeable formation intervals Emplacement Tools In one or more embodiments, methods in accordance with the present disclosure may include the use of specialized wellbore tools that store the polymer-forming compositions separately and, upon delivery to the treatment site, mix the components to generate a polymer in situ. With particular respect to FIG. 5, a wellbore tool 500 may be equipped with storage vessels for a resin composition 504 and a catalyst/initiator composition 506. Upon placement within a formation 510, which may be lined with cement 512 and/or casing 514, injection fluid 502 may be pumped into the tool from above. The pumped fluid 502 displaces the resin 504 and catalyst 506 into a mixing region 508, which produces slurry 509 that is emplaced within wellbore 514 and cures to generate cured polymer mass 516. In some embodiments, the cured polymer mass 516 may prevent fluid ingress/egress from the wellbore and/or repair unconsolidated regions of the formation.

EXAMPLES

All experiments described herein have been performed under ambient air conditions unless noted otherwise. DCPD monomer, dichloro[1,3-bis(2,4,6-trimethylphenyl)-2-imidazolidinylidene](3-phenyl-1H-inden-1-ylidene)(triphenylphosphine)ruthenium(II) catalyst (M2), cumene hydroperoxide, triisopropyl phosphate, scale inhibitor (Diethylenetriaminepentakis(methylphosphonic acid) solution), xylenes and ethyl benzoate are purchased from Sigma Aldrich. Materia DCPD resin and Materia Ru catalyst were purchased from MATERIA, INC™. FTIR spectra were acquired on a Bruker Vertex 70 infrared spectrometer. Differential Scanning Calorimetry (DSC) and Thermogravimetric Analysis (TGA) analyses were performed using DSC-Q200 and TGA-Q500 respectively.

General Method of Testing In Situ Polymerization of DCPD

In a first example, a solvent such as xylene or ethyl benzoate was used to prepare a solution of 6 g DCPD in 0.2 ml of solvent, and various additives (cumene hydroperoxide, styrene, etc.) were added into a 15 mL glass test tube. In order to mimic downhole conditions where the organic phase containing the monomer and initiator contacts the aqueous phase, 2-3 mL of aqueous fluids selected from DI water, produced water, 0.5% aqueous solution of scale inhibitor, or about 1 w/w % solution of PLURONIC P123™ were added into the reaction tube, then swirled vigorously to induce good contact between the organic phase and aqueous phase. The test tube was left undisturbed and phase separation developed—the organic phase is on the top and the aqueous phase is at the bottom of the test tube. The catalyst solution was then added into the test tube using a syringe, and the organic phase was mixed homogenously by swirling the test tube or mixing using a pipette. The reaction mixture was then kept in a water/oil bath at a desirable temperature and the reaction exothermal temperature was monitored by a thermal couple. The sample formulations and results are provided in the following sections.

Reaction Kinetics

The exothermal profiles for the polymerizations were obtained using a Thermocouple Temperature USB Data Logger. Exothermal peak time, or time to peak exothermal (TtP), is the length of time between the moment when the reaction mixture temperature reached 40° C. (when the bath temperatures are greater than 50° C.) and the moment of the exothermal peak temperature.

Compression Test

Samples for compression tests were prepared using Buehler Linear Precision Saw. Compressive properties were measured using an Instron 100 kN at room temperature and 98° C. The samples were not dried before measurements.

Example 1—ROMP in Polymerizable Compositions

In a first set of examples, 6 g of DCPD was mixed with 0.2 mL of ethyl benzoate or xylene solvent and 3 mg of cumene hydroperoxide (CHP) solution (0.05 wt % of CHP in 0.05 ml of ethyl benzoate). Then 1.2 mg of M2 catalyst was dissolved in 0.05 ml of ethyl benzoate and was quickly added into the mixture using a syringe. The mixture becomes homogeneous by swirling or pipetting. Then, 2-3 mL of DI water was quickly added into the test tube and the tube was swirled vigorously to allow the organic phase to get into close contact with the aqueous phase. The test tube equipped with a thermal couple was then quickly moved into a pre-warmed water (or oil) bath, and the reaction mixture temperature was allowed to increase to the desirable temperature. The test tube was left undisturbed in the bath until completion of the polymerization. In the polymerization of DCPD/TriCPD (a liquid resin from MATERIA, INC.™), the reaction was performed in an analogous method, except 6 g of DCPD/TriCPD was used instead of DCPD in the solvent.

Polymerization with a donating ligand (i-PrO)3P added was performed in an analogous method, but instead of 1.2 mg M2 catalyst in 0.05 mL ethyl benzoate solution, 0.05 mL ethyl benzoate solution of M2 catalyst and 1 or 4 molar equivalent of (i-PrO)3P (equilibrated at room temperature for at least 30 minutes before being used) was added into the reaction mixture. For comparison of properties, some ROMP of DCPD were performed in an analogous fashion as described above but without the aqueous phase added.

ROMP of DCPD using M2 as a catalyst completed within a few minutes at 80° C. in ambient atmosphere in a number samples containing aqueous fluids including water; produced water; water containing glycerol; water containing 0.5 wt % of diethylenetriaminepentakis (methylphosphonic acid) scale inhibitor in solution with 15 vol % HCl, 35 vol % H2O); and water containing 1 wt % PLURONIC P123™ surfactant to produce an emulsion. The Tg of all the formed pDCPD including the powders formed from the PLURONIC™ P123/water/DCPD emulsion are above 140° C., which suggested a well-established crosslinking network.

Example 2—Controlling the Viscosity of a Polymerizable System

In the next example, benzoate ester solvent was assayed for its ability to modify fluid viscosity without negatively impacting the polymerization rate or properties of the final polymer. In one or more embodiments, benzoate esters may be used as the solvent.

As shown in Table 1, up to 5 v % of EB in DCPD turn DCPD into a low viscosity liquid at 25° C. without adverse impact on the ROMP reactions. The upper limit of EB to produce a hard polymer appears to is 20 v/v % DCPD, while the addition of higher proportions of solvent results in the production of rubbery materials due to the trapping of a large amount of solvent in the polymer network.

TABLE 1

Effect of solvent ratio on the Tg of pDCPD

| Solv. | Solvent Vol. (v/v % in DCPD) | Tg (° C.)* | Qualitative observations |
|---|---|---|---|
| EB | 3.4 | 171 | Hard |
| EB | 19.7 | 140 | Hard but noticeably softer than 3.4 v/v %. |
| EB | 50 | 146 | Rubber like |

*Tg was measured as the second scan of DSC curves.
M2 catalyst loading is 28 ppm of molar DCPD Example 3: Controlling DCPD Polymerization Rate The impact of catalyst loading on the rate of ROMP was also studied. As shown in Table 2, to achieve high peak temperature which is an indication of a high degree of polymerization (higher than Tg of pDCPD), the minimum M2 loading is 28 ppm of molar DCPD monomer.

TABLE 2

The impact of catalyst concentration on TtP of ROMP

| Exp. # | Cat./ Monomer (ppm) | Cat./ Monomer (wt %) | TTP (peak time) (min) | Peak temp. (° C.) | Observations |
|---|---|---|---|---|---|
| 14-1 | 70 | 0.05 | 2.7 | 160 | Hard solid |
| 17-1 | 28 | 0.02 | 10.5 | 159 | Hard solid |
| 14-2 | 7 | 0.005 | 23.5 | 67 | Hard solid |
| 14-3 | 1.4 | 0.001 | NA | NA | Soft gel > 1.5 h |

Figure 6:
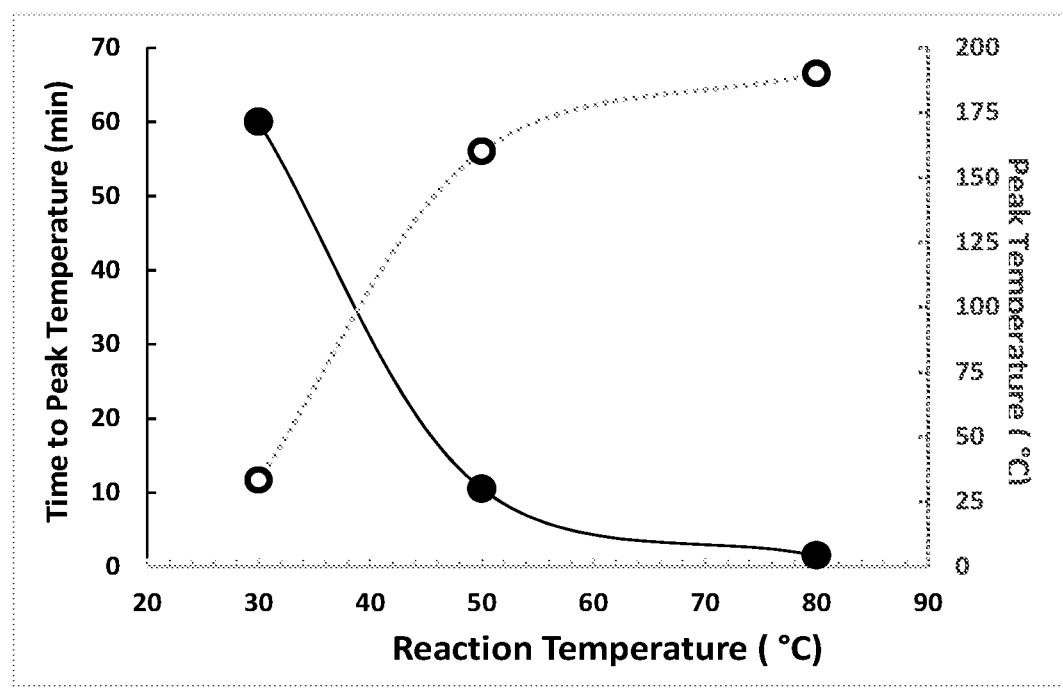
FIG. 6 is a graphical representation of reaction temperature and peak temperature as a function of time to peak exothermic activity in accordance with embodiments of the present disclosure.

In the next example, reaction kinetics for polymerizable compositions in accordance with the present disclosure were studied at various temperatures. Because about 75% market by stage count of hydraulic fracturing are at temperatures below 71° C., and the temperatures of fracturing fluids are at ambient temperatures (up to 50° C. in extreme locations), the reaction temperature (water bath temperature) could be set at around 50° C. The rate of ROMP and the time to peak exothermal (TtP) is temperature dependent. As shown in FIG. 6, the ROMP of DCPD using 28 ppm in mole M2 catalyst (0.02 wt %) in 30° C. water bath takes about one hour to reach the peak temperature of 33° C., suggesting the reaction may not be complete despite forming a solid polymer mass. When the water bath temperature is at 50° C., the TtP is about 10 minutes with peak temperature of 160° C. The high peak temperature indicates that the reaction temperature should be more than 40-50° C. if complete reaction of the ROMP is desired.

Figure 7:
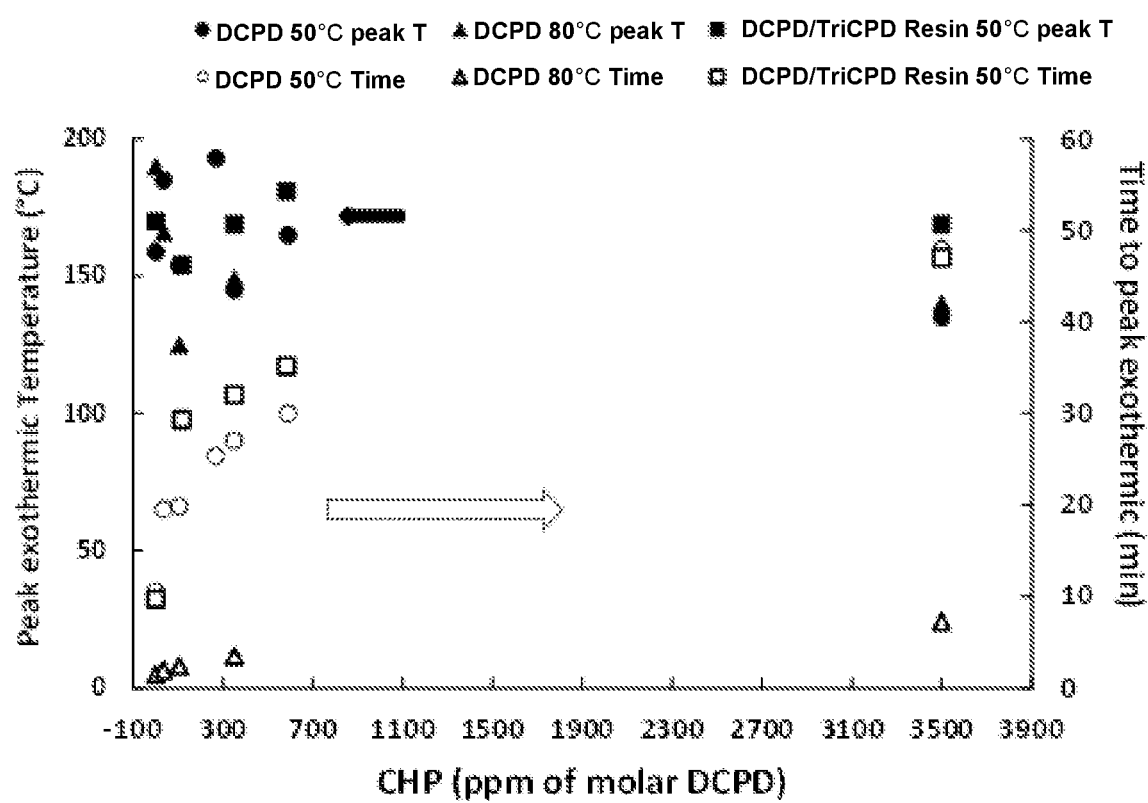
FIG. 7 is a graphical representation of reaction temperature and peak temperature as a function of CHP in accordance with embodiments of the present disclosure.

In the next example, cumene hydroperoxide (CHP) was used to delay ROMP of DCPD. With particular respect to FIG. 7, the time-to-peak exothermic (hollow symbols) increase as the concentration of CHP increases from 0% to 0.5 wt % at both 50° C. and 80° C. reaction temperatures, without sacrificing the exothermic temperatures (solid symbols). At 50° C. with 0.05 wt % of CHP, the TtP of ROMP is about 27 minutes.

Example 4: Ligand Effect on Catalyst

In another example, a strong electron donating ligand was added to the solution of M2 catalyst to decrease the polymerization rate. Tri-isopropyl phosphite (i-PrO)3P was combined with M2 catalyst in ethyl benzoate solvent at room temperature for about 30 minutes, followed by combination with a polymerizable system. As shown in Table 3, one mole equivalent of (i-Pro)3P to M2 catalyst delays TtP by 7 minutes at 50° C., without adverse impact on the mechanical properties. Further, one mole equivalent of (i-Pro)3P doubles the TtP when reacted at at 80° C.

TABLE 3

The impact of different concentration of donating group (i-Pro)$_3$P on reaction time at 50 and 80° C. using 28 mole ppm of M2catalyst

| (i-Pro)$_3$P (ppm) | (i-Pro)$_3$P/M2 (mole ratio) | TtP at 50° C. (min) | Compression yield strength (MPa) RT | Compression yield strength (MPa) 98° C. | compression yield modulus (GPa) RT | compression yield modulus (GPa) 98° C. |
|---|---|---|---|---|---|---|
| 0 | 0 | 9.70 | 88 | 47 | 1.55 | 1 |
| 28 | 1 | 16.80 | 82 | 50 | 0.95 | 0.94 |
| 112 | 4 | 60.00 | 46 | Not observed | 1.21 | 0.006 |
| 112 | 4 + 350 ppm CHP | 32.00 | 46 | Not observed | 1.21 | 0.006 |

| (i-Pro)3P (ppm) | (i-Pro)$_3$P/M2 (mole ratio) | TtP at 80° C. (min) | Compression Strength RT | Compression yield strength (MPa) 98° C. | compression yield modulus (GPa) RT | compression yield modulus (GPa) 98° C. |
|---|---|---|---|---|---|---|
| 0 | 0 | 1.50 | compression yield strength 80-90 MPa at RT | | | |
| 28 | 1 | 3.80 | 73 | 33 | 1.42 | 1.1 |
| 112 | 4 | 4.30 | 53 | 3 | 1.33 | 0.11 |
| 112 | 4 + 350 ppm CHP | 4.80 | 78 | 30 | 1.47 | 0.99 |

Figure 8:
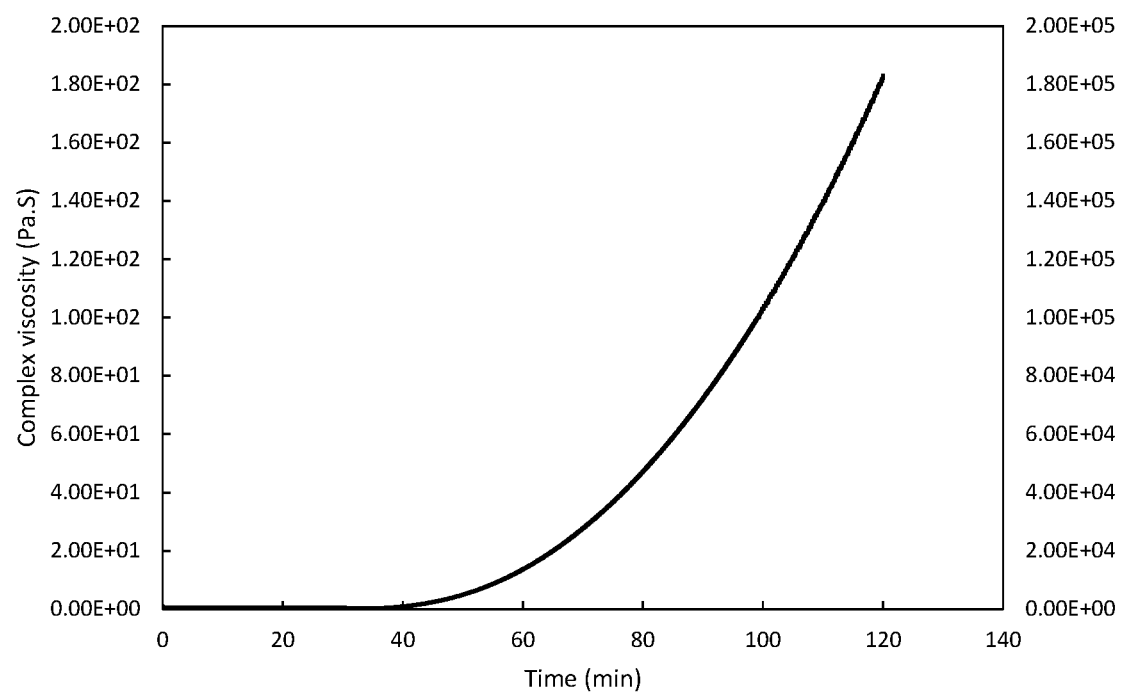
FIG. 8 is a graphical representation of complex viscosity as a function of time for a sample in accordance with embodiments of the present disclosure.

The change in the viscosity of the resin was also tracked using a rheometer in oscillation mode with fixed strain (1%) and 50 rad/s frequency. With particular respect to FIG. 8, complex viscosity is shown as a function of time for a curing resin at a temperature of 50° C. The resin formulation contained of 10 g of DCPD/TriCPD, 200 μL of catalysts and 10 μL of (i-Pro)$_3$P.

Example 4: Mechanical Properties of pDCPD

Figure 9:
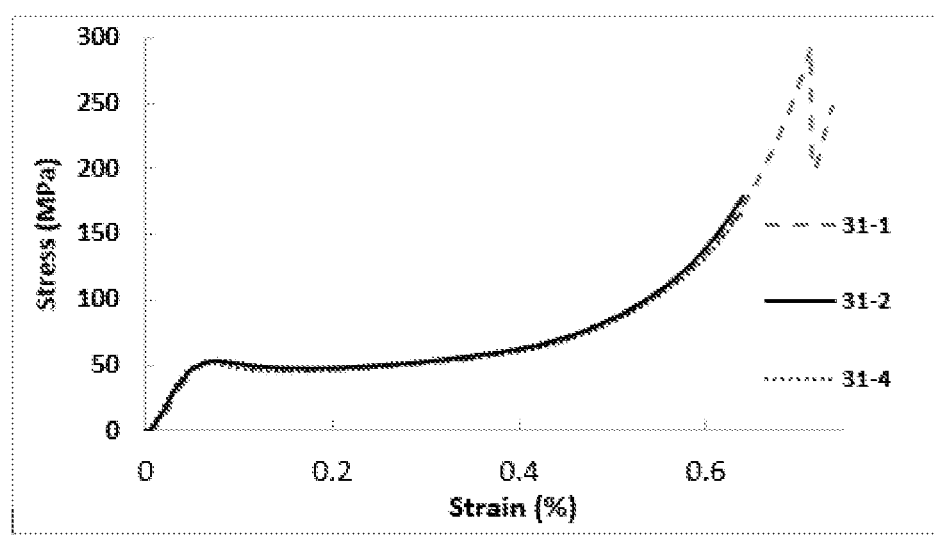
FIG. 9 is a graphical representation of stress as a function of strain for a sample in accordance with embodiments of the present disclosure.

Compression strength of resin samples were measured at room temperature (around 25° C.) and 98° C. using polymerized samples (wet samples), which should represent the characteristics of a solid polymer generated downhole. With particular respect to FIG. 9, a typical stress-strain curve is shown for a number of pDCPD compositions tested at room temperature. Sample formulations and results are shown in Table 4.

TABLE 4

The impact of catalyst concentration on TtP of ROMP

| Exp. # | Rx Temp (° C.) | Solv. Vol. (v/v %) | CHP (ppm) | M2 Conc. (ppm) | TtP (min) |
|---|---|---|---|---|---|
| 31-1 | 50 | 4.7 | 0 | 28 | 15 |
| 31-2 | 50 | 4.7 | 82 | 28 | 21 |
| 31-3 | 50 | 4.7 | 677 | 28 | 31 |

Figure 10:
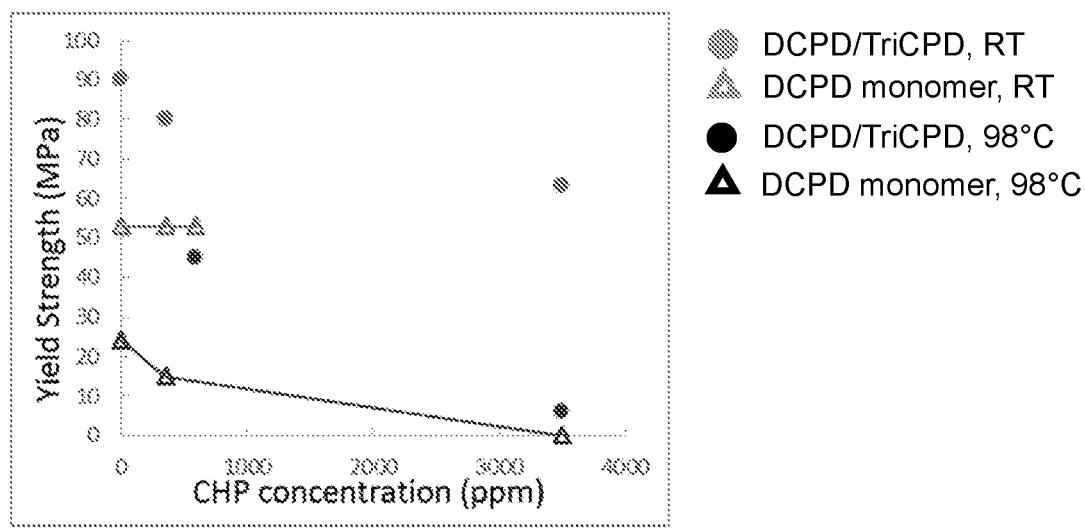
FIG. 10 is a graphical representation of yield strength reaction temperature and peak temperature as a function of CHP (cumene hydroperoxide) in accordance with embodiments of the present disclosure.

Further, with respect to FIG. 10, samples containing a 70%/30% mixture of dicyclopentadiene and tricyclopentadiene, and demonstrate a higher compression yield strength than the samples made from pure pDCPD when tested at room temperature and 98° C.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A method comprising:
    introducing a polymerizable composition comprising a polycyclic monomer and a catalyst into a subterranean formation; and
    polymerizing the polymerizable composition in the presence of the catalyst in situ in the subterranean formation to form a polymer, wherein the polymerizable composition and the catalyst are maintained separate from one another until the polymerizable composition and the catalyst are located below a surface of the earth, wherein the polymerizable composition comprises 0.5 vol % to 20 vol % of a benzoate ester.

2. The method of claim 1, wherein the polymerizable composition comprises dicyclopentadiene or a mixture of dicyclopentadiene and one or more unsaturated olefins.

3. The method of claim 1, wherein the polymerizable composition comprises a mixture of dicyclopentadiene (DCPD) and tricyclopentacliene (TriCPD) at a ratio of DCPD:TriCPD ranging from 0.5:1 to 1:0.1.

4. The method of claim 1, wherein introducing the polymerizable composition and the catalyst into the subterranean formation comprises:
    injecting a multistage fracturing treatment into the wellbore comprising:
        one or more stages of the polymerizable composition, and one or more stages of a spacer fluid; and
    wherein polymerizing the polymerizable composition in situ to form a polymer comprises curing the one or more stages of polymerizable composition to generate one or more solid polymer pillars having a glass transition temperature of at least 200"F. in the subterranean formation.

5. The method of claim 4, wherein the ratio of the one or more stages of the polymerizable composition and one or more stages of the spacer fluid is within the range of 1:0.1 to 0.1:1.

6. The method of claim 1, wherein the polymerizable composition further comprises a hydroperoxide agent, one or more surfactants, or a mixture thereof.

7. The method of claim 1, wherein the catalyst comprises an electron donating group tri-isopropyl phosphate, wherein the electron donating group delays polymerization of the polymerizable composition.

8. The method of claim 1, wherein the catalyst is a ruthenium catalyst having the structure:

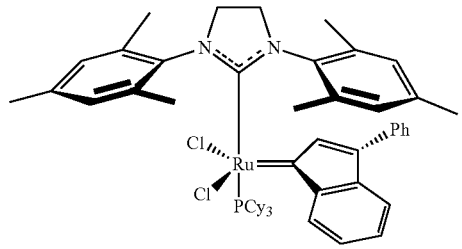

9. The method of claim 1, wherein the polymer is used for one or more selected from a group consisting of: cement replacement and well plugging and abandonment.

10. The method of claim 1, wherein the catalyst comprises a ring opening metathesis catalyst, and wherein the polymerizable composition further comprises a benzoate ester.

11. The method of claim 1, wherein:
    the polymerizable composition comprises dicyclopentadiene and a benzoate ester or dicyclopentadiene, an unsaturated olefin, and a benzoate ester,
    and the polymer formed in situ in the subterranean formation is a solid and is used for cement replacement or well plugging and abandonment.

12. The method of claim 1, wherein the polymer formed in situ in the subterranean formation has a glass transition temperature of at least 200° F.

13. The method of claim 1, wherein the polymer formed in situ in the subterranean formation has a compressive yield strength, measured at a temperature of 98° C., of 1 MPa to 90 MPa.

14. The method of claim 1, wherein:
the catalyst comprises a ring opening metathesis catalyst,
the polymerizable composition further comprises a benzoate ester, and
the polymer formed in situ in the subterranean formation has a glass transition temperature of at least 300° F. and a compressive yield strength, measured at a temperature of 98° C., of 30 MPa to 90 MPa.

15. The method of treating a subterranean formation penetrated by a wellbore, comprising:
lowering a wellbore tool into the subterranean formation, wherein the tool comprises a first partition containing a polymerizable composition comprising a polycyclic monomer and a benzoate ester, and a second partition containing a ring opening metathesis catalyst;
releasing the polymerizable composition from the first partition;
releasing the ring opening metathesis catalyst from the second partition;
contacting the polymerizable composition and the ring opening metathesis catalyst in a mixing region located below a surface of the earth, wherein the polymerizable composition and the ring opening metathesis catalyst are maintained separate from one another until the polymerizable composition and the ring opening metathesis catalyst are contacted within the mixing region located below the surface of the earth; and
reacting the polymerizable composition and the ring opening metathesis catalyst in situ to form a polymer, wherein the polymerizable composition comprises 0.5 vol % to 20 vol % of a benzoate ester.

16. The method of claim 15, wherein the benzoate, ester comprises ethyl benzoate.

17. The method of claim 15, wherein the polymerizable composition comprises dicyclopentadiene or a mixture of dicyclopentadiene and one or more unsaturated olefins.

18. The method of claim 15, wherein the polymer formed in situ has a glass transition temperature of at least 200"F.

19. A method of treating a subterranean formation penetrated by a wellbore, comprising:
lowering a wellbore tool into the subterranean formation, wherein the tool comprises a first partition containing a polymerizable composition, and a second partition containing a catalyst;
releasing the polymerizable composition from the first partition;
releasing the catalyst from the second partition;
contacting the polymerizable composition and the catalyst in a mixing region located below a surface of the earth, wherein the polymerizable composition and the catalyst are maintained separate from one another until the polymerizable composition and the catalyst are contacted within the mixing region located below the surface of the earth; and
reacting the polymerizable composition and the catalyst in situ to form a polymer having a glass transition temperature of at least 200° F., wherein the polymerizable composition comprises 0.5 vol % to 20 vol % of a benzoate ester.

* * * * *